US012085267B2

(12) United States Patent
Jurik et al.

(10) Patent No.: US 12,085,267 B2
(45) Date of Patent: Sep. 10, 2024

(54) SYSTEM AND METHOD FOR CONTROLLING THE HUMIDITY AND PRESSURE IN A LUMINAIRE

(71) Applicant: ROBE lighting s.r.o., Roznov pod Radhostem (CZ)

(72) Inventors: Pavel Jurik, Prostredni Becva (CZ); Jindrich Vavrik, Zubri (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 18/045,363

(22) Filed: Oct. 10, 2022

(65) Prior Publication Data

US 2023/0417402 A1 Dec. 28, 2023

Related U.S. Application Data

(63) Continuation-in-part of application No. 17/901,231, filed on Sep. 1, 2022, and a continuation-in-part of application No. 17/851,742, filed on Jun. 28, 2022.

(51) Int. Cl.
*F21V 29/61* (2015.01)
*F21V 14/00* (2018.01)
(Continued)

(52) U.S. Cl.
CPC ............ *F21V 29/61* (2015.01); *F21V 14/006* (2013.01); *F21V 21/15* (2013.01); *F21V 29/503* (2015.01);
(Continued)

(58) Field of Classification Search
CPC ........ F21V 29/503; F21V 29/61; F21V 31/03; F21V 14/006; F21V 21/15;
(Continued)

(56) References Cited

U.S. PATENT DOCUMENTS 4,405,974 A 9/1983 Quiogue
4,701,833 A 10/1987 Bornhorst
(Continued)

FOREIGN PATENT DOCUMENTS

CN 106907684 A 6/2017
CN 109357206 A 2/2019
(Continued)

OTHER PUBLICATIONS

European Extended Search Report; Application No. 22200965.6; Jun. 12, 2023; 5 pages.
(Continued)

*Primary Examiner* — Alan B Cariaso
(74) *Attorney, Agent, or Firm* — Conley Rose, P.C.; Brooks W Taylor

(57) ABSTRACT

A luminaire includes an enclosure, an air valve, and a chamber. The enclosure includes a sealed cover and light beam emitting components. The air valve is air coupled between the enclosure and the chamber. The chamber includes a drying agent and has an opening with a membrane completely covering the opening. The membrane passes air while reducing the passage of water droplets in the air. The air valve blocks air passage between the enclosure and the chamber when closed. A method for testing to determine adequate sealing of an enclosure of a luminaire includes closing an air valve to seal the enclosure from outside air, activating a heat-generating component, determining whether an air pressure in the enclosure increases by more than a threshold value, and sending a signal indicating a result of the determination. The method includes deactivating the heat-generating component and opening the air valve.

20 Claims, 10 Drawing Sheets

(51) Int. Cl.

| | |
|---|---|
| ***F21V 21/15*** | (2006.01) |
| ***F21V 29/503*** | (2015.01) |
| ***F21V 31/03*** | (2006.01) |
| ***F21W 131/406*** | (2006.01) |

(52) U.S. Cl.
CPC ....... *F21V 31/03* (2013.01); *F21W 2131/406* (2013.01)

(58) Field of Classification Search
CPC ......... F17C 2205/0138; F17C 2250/03; H05B 47/28; F21W 2131/406
See application file for complete search history.

(56) References Cited

U.S. PATENT DOCUMENTS

| | | | | |
|---|---|---|---|---|
| 9,777,917 | B2 | 10/2017 | Johansen | |
| 11,549,679 | B2 * | 1/2023 | Jurik | F21V 23/001 |
| 2017/0184288 | A1 | 6/2017 | Owens et al. | |
| 2022/0325883 | A1 | 10/2022 | Jurik et al. | |

FOREIGN PATENT DOCUMENTS

| | | | |
|---|---|---|---|
| CN | 110657366 | A | 1/2020 |
| CN | 211526189 | U | 9/2020 |
| CN | 113339745 | A | 9/2021 |
| CN | 113464870 | A | 10/2021 |
| DE | 102006028295 | A1 | 12/2007 |
| KR | 100948151 | B1 * | 3/2010 |
| WO | 2016201045 | A1 | 12/2016 |
| WO | 2020201255 | A1 | 10/2020 |

OTHER PUBLICATIONS

European Extended Search Report; Application No. 22201083.7; May 31, 2023; 8 pages.

Jurik, Pavel, et al.; U.S. Appl. No. 17/901,231, filed Sep. 1, 2022; Title: System and Method for Controlling the Humidity and Pressure in a Luminaire; 34 pages.

Jurik, Pavel, et al.; U.S. Appl. No. 18/093,617, filed Jan. 5, 2023; Title: System and Method for Controlling the Humidity and Pressure in a Luminaire; 29 pages.

Gore; "Gore Protective Vents for Lighting Enclosures"; https://www.gore.com/products/gore-protective-vents-for-lighting-enclosures; Retrieved Jun. 1, 2022; 7 pages.

Gore; "Resource Library"; https://www.gore.com/resources/search?f[]=product:66&f[]=content_type:21&f[]=language:en; Retrieved May 25, 2022; 2 pages.

Notice of Allowance issued Sep. 14, 2022; U.S. Appl. No. 17/851,742, filed Jun. 28, 2022; 14 pages.

* cited by examiner

SYSTEM AND METHOD FOR CONTROLLING THE HUMIDITY AND PRESSURE IN A LUMINAIRE

CROSS-REFERENCE TO RELATED APPLICATIONS

This application is a continuation-in-part of U.S. patent application Ser. No. 17/851,742 filed Jun. 28, 2022 by Pavel Jurik, et al. entitled "System and Method for Controlling the Humidity and Pressure in a Luminaire". This application also is a continuation-in-part of U.S. patent application Ser. No. 17/901,231 filed Sep. 1, 2022 by Pavel Jurik, et al. entitled "System and Method for Controlling the Humidity and Pressure in a Luminaire", both of which are incorporated by reference herein as if reproduced in their entirety.

TECHNICAL FIELD OF THE DISCLOSURE

The disclosure generally relates to luminaires, and more specifically to a method for controlling the humidity and pressure inside a luminaire.

BACKGROUND

Luminaires with automated and remotely controllable functionality (which may be referred to as automated luminaires) are well known in the entertainment and architectural lighting markets. Such products are commonly used in theatres, television studios, concerts, theme parks, night clubs, and other venues. A typical automated luminaire provides control from a remote location of the pan and tilt functions of the luminaire allowing an operator to control the direction the luminaire is pointing and thus the position of the light beam on the stage or in the studio. Many automated luminaires additionally or alternatively provide control from the remote location of other parameters such as intensity, focus, zoom, beam size, beam shape, and/or beam pattern of light beam(s) emitted from the luminaire. Such automated luminaire products are often used outdoors in, for example, theme parks or concerts. Maintaining a dry, controlled physical environment inside an automated luminaire is important for the continuing operation of the unit.

BRIEF DESCRIPTION OF THE DRAWINGS

For a more complete understanding of this disclosure, reference is now made to the following brief description, taken in conjunction with the accompanying drawings in which like reference numerals indicate like features.

SUMMARY

Figure 1:
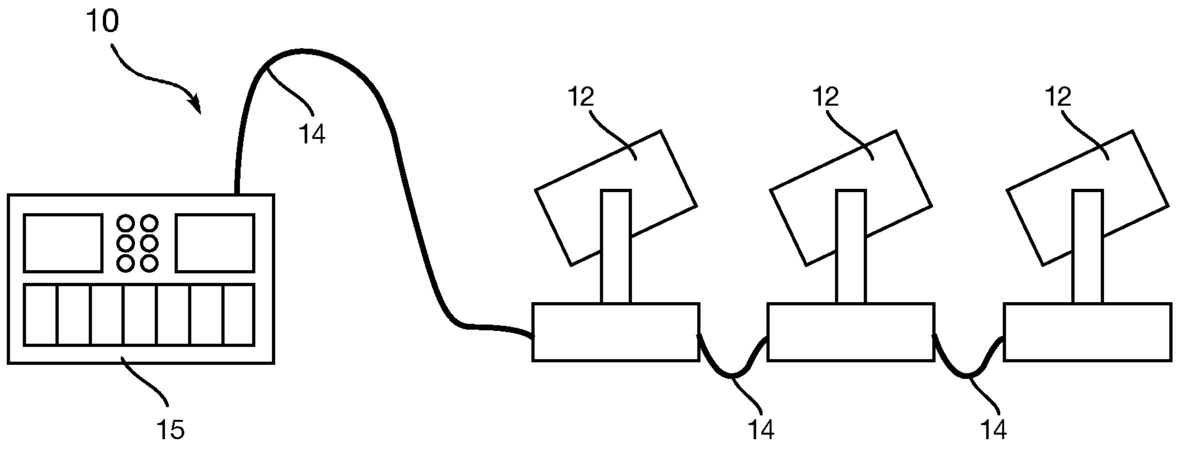
FIG. 1 presents a schematic view of a luminaire system according to the disclosure.

In a first embodiment, a luminaire includes an enclosure, a remotely operable air valve, and a chamber. The enclosure includes one or more luminaire components that are configured to modify and emit a light beam. The enclosure also includes a sealed cover and a first opening. The enclosure is otherwise sealed from external air. The air valve includes second and third openings and is coupled at the second opening by a sealed air coupling to the enclosure at the first opening. The chamber includes a drying agent and fourth and fifth openings. The chamber is otherwise sealed from the external air. The chamber is coupled at the fourth opening by a sealed air coupling to the air valve at the third opening. The fifth opening includes a membrane that completely covers the fifth opening. The membrane includes a material that is configured to allow air to pass through the material while reducing the passage of water droplets in the air. The air valve is configured to block air passage between the enclosure and the chamber when closed.

In a second embodiment, a method for performing a test to determine whether an enclosure of a luminaire is adequately sealed includes closing an air valve to seal the enclosure from outside air and determining an initial air pressure in the enclosure. The method also includes activating a heat-generating component of the enclosure and waiting for a predetermined time period. The method further includes determining whether a current air pressure in the enclosure has increased from the initial air pressure by more than a threshold pressure change value and sending a signal indicating a result of the determination of whether the current air pressure in the enclosure has increased from the initial air pressure by more than a threshold pressure change value. The method still further includes deactivating the heat-generating component and opening the air valve.

DETAILED DESCRIPTION

Preferred embodiments are illustrated in the figures, like numerals being used to refer to like and corresponding parts of the various drawings.

If a luminaire (or fixture) is used outdoors or in another area where it is subject to rain, weather, or high humidity it is important to protect any luminaire mechanisms and optical systems from the effects of moisture and humidity. Some fixtures may have sealed housings or semi-sealed housings with pressure equalization. Such fixtures may suffer from effects caused by the thermal operating cycle, as follows. When an automated luminaire is turned on, internal systems such as light sources, electronic circuits, power supplies, and motors generate heat and cause the temperature inside the fixture to rise. Such a rise in temperature produces a corresponding increase in the air pressure within the luminaire.

In some fixtures, this pressure is contained within the luminaire using hermetic seals. The load on such a hermetic seal from such a pressure increase within the luminaire can be significant and the repair and maintenance of the seals may be expensive and/or difficult. A failure in such seals may lead to water ingress into the luminaire, which may lead to damage or degradation of the luminaire mechanisms and/or optical systems.

In other fixtures, the fixture is sealed, but the pressure is allowed to escape through pressure relief valves. However, when such a fixture is powered off and cools down, its internal pressure drops relative to atmospheric pressure outside the fixture and external air (or outside air) and moisture may be drawn back into the luminaire through the seals, the pressure relief valve, or other paths. This too can lead to water ingress to the luminaire or condensation within the luminaire and damage or degradation of the luminaire mechanisms and/or optical systems.

Luminaires according to the disclosure are sealed, but also are vented to the outside air through a system that removes excess humidity from incoming air and reduces condensation within the luminaire. This has the advantage of reducing water ingress to the luminaire and condensation within the luminaire, as well as reducing damage or degradation of the luminaire mechanisms and/or optical systems.

Luminaires according to the disclosure are also segmented into enclosures that are sealed and are coupled to each other to allow passage of air between the enclosures. The connected enclosures are vented to the outside air through each other to a single water and humidity reducing system. In such embodiments, the enclosures are coupled by air passages that are rotatably coupled to the enclosures, giving the advantage of allowing one or more of the enclosures to rotate relative to each other while reducing water ingress to the luminaire and condensation within the luminaire. Optical, mechanical, and electrical components of the luminaire may be located in various ones of the enclosures as appropriate to the design and functioning of the luminaire.

FIG. 1 presents a schematic view of a luminaire system 10 according to the disclosure. The luminaire system 10 includes a plurality of luminaires 12 according to the disclosure. The luminaires 12 each contains on-board a light source, one or more of color changing systems, light modulation devices, and pan and/or tilt systems to control an orientation of a head of the luminaire 12. Mechanical drive systems to control parameters of the luminaire 12 include motors or other suitable actuators coupled to a control system, as described in more detail with reference to FIG. 6, which is configured to control the motors or other actuators.

In addition to being connected to mains power either directly or through a power distribution system, the control system of each luminaire 12 is connected in series or in parallel by a wired data link 14 to one or more control desks 15. Upon actuation by an operator, the control desk 15 sends control signals (such as commands) via the data link 14, where the control signals are received by the control system of one or more of the luminaires 12. The control systems of the one or more of the luminaires 12 that receive the control signals may respond by changing one or more of the parameters of the receiving luminaires 12. The control signals are sent by the control desk 15 to the luminaires 12 using DMX-512, Art-Net, ACN (Architecture for Control Networks), Streaming ACN, or other suitable communication protocol.

The luminaire head of the luminaire 12 comprises an optical system comprising one or more luminaire mechanisms, each of which includes one or more optical devices such as gobo wheels, effects wheels, and color mixing (or other color changing) systems, as well as prism, iris, shutter, and lens movement systems. The term luminaire mechanisms further includes a pan and tilt mechanism configured to move the luminaire head relative to a fixed portion of the luminaire 12. Some or all of the luminaire mechanisms may include stepper motors or other rotating actuators to cause movement of their associated optical device(s).

Figure 2:
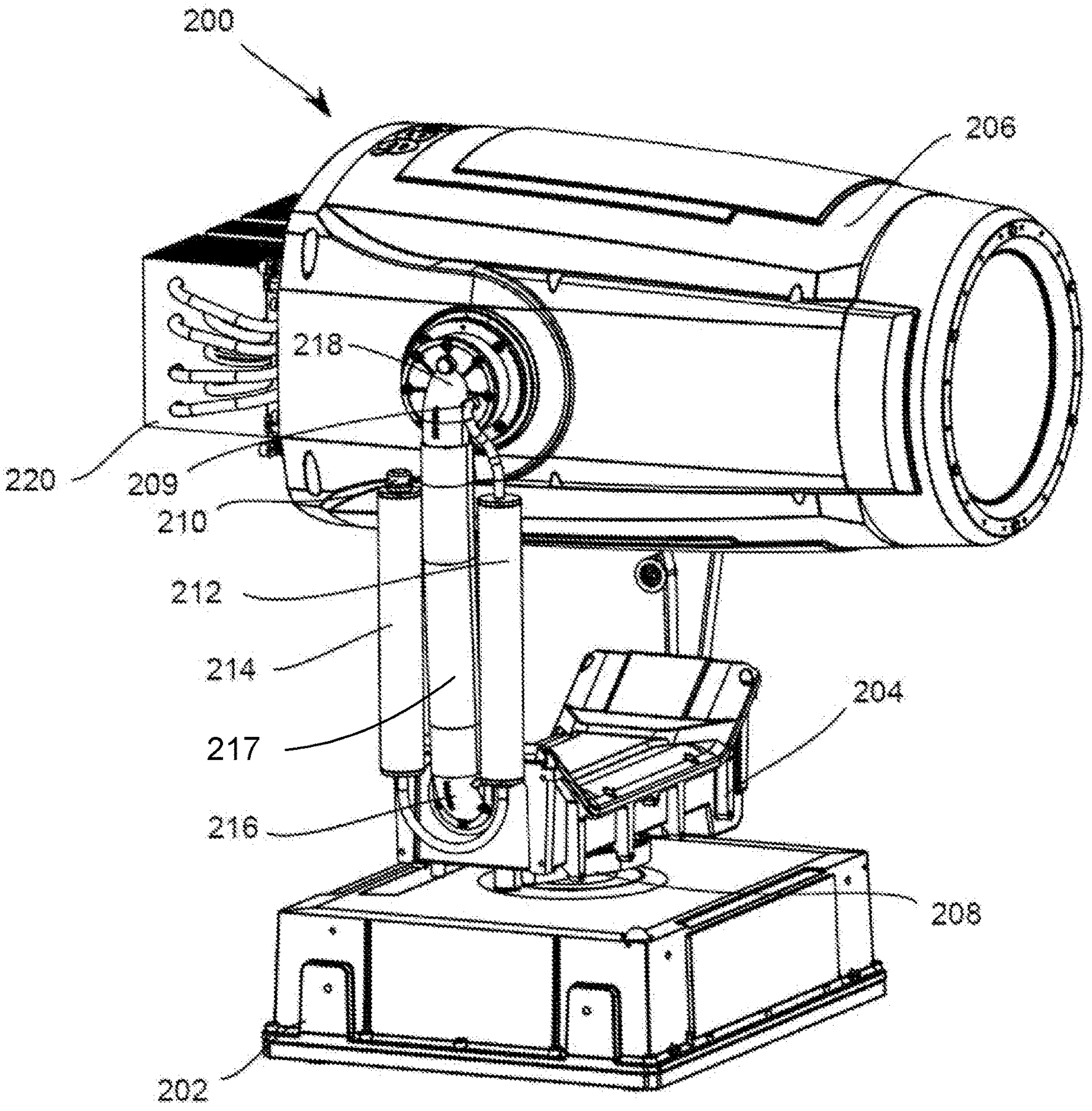
FIG. 2 presents a first view of a luminaire comprising a luminaire humidity and pressure control system according to the disclosure.

FIG. 2 presents a first view of a luminaire 200 comprising a luminaire humidity and pressure control system according to the disclosure. FIG. 2 shows the luminaire 200 with some components removed so that the humidity and pressure control system is more easily seen and described. The luminaire 200 may comprise a number of separate enclosures that can be protected by the humidity and pressure control system. The luminaire 200 includes a base enclosure 202, a motor enclosure 204, and a head enclosure 206. The base enclosure 202 is a portion of the luminaire that is typically fixedly attached to or rests on a supporting structure and remains stationary. The base enclosure 202 may include power supplies, interface electronic circuits, and other control equipment. The motor enclosure 204 may include the motors and associated electronic circuits that control pan and/or tilt motion of the luminaire head. The head enclosure 206 may include luminaire components such as optical devices and associated motors, as well as electronic circuits and other control electronics. A light source 220 may be located within the head enclosure 206 or may be external to, but optically coupled with, the head enclosure 206, as described in more detail with reference to FIG. 4. The light source 220 and the luminaire components produce and modify a light beam that is emitted from the head enclosure 206. The head enclosure 206 moves in a tilt direction relative to the motor enclosure 204, the motor enclosure 204 moves in a pan direction relative to the base enclosure 202. Thus, the head enclosure 206 is rotatably mounted to the base enclosure 202 by the motor enclosure 204.

Although the luminaire 200 includes three enclosures, in other embodiments any number of enclosures may be included. For example, a light bar or cyclorama luminaire may have only the head enclosure 206 mounted for tilt motion relative to the base enclosure 202. The motors and associated electronic circuits that control tilt motion of such a luminaire may be located in either or both of the base enclosure 202 and/or the head enclosure 206. Still other embodiments may include only a single enclosure or more than three enclosures. The ability to increase the number of enclosures in a luminaire according to the disclosure provides the advantage of increasing the number of luminaire components that may be protected from damage or degradation caused by water ingress and/or condensation, while also allowing the additional components to rotate relative to each other. It is to be understood that when the phrase 'connected enclosures' is used in this specification, it means one or more enclosures.

All three enclosures 202, 204, and 206 are sealed from external air such that external air does not pass through the seals. However, the enclosures 202, 204, and 206 are connected together and vented through drying tubes 212 and 214 that allow air to flow into and out of the enclosures, such that an internal air pressure in the enclosures 202, 204, and 206 never rises significantly above or below an external atmospheric pressure, thereby reducing pressure on the seals of the enclosures. In the luminaire 200, the base enclosure 202 is vented to the motor enclosure 204 through a pipe 208 that couples an opening in the base enclosure 202 to an opening in the motor enclosure 204.

The pipe 208 provides a rotatable sealed air coupling between the base enclosure 202 to the motor enclosure 204. The coupling is an air coupling because it allows passage of air from the base enclosure 202 to the motor enclosure 204.

The coupling is a sealed air coupling because it is sealed from the external air. The coupling is a rotatable sealed air coupling because it comprises rotating flanges, gaskets, seals, and/or other elements configured to allow the base enclosure 202 and the motor enclosure 204 to rotate relative to each other while still allowing the passage of air. A sealed air coupling that does not allow the pipe 208 to rotate relative to the base enclosure 202 or the motor enclosure 204 may be referred to as a sealed air coupling or as a fixed sealed air coupling. The pipe 208 provides a rotatable sealed air coupling that is configured to pass air from the base enclosure 202 to the motor enclosure 204, sealed from the external air, through the rotating pan system at the base of the motor enclosure 204 by which the motor enclosure 204 rotates relative to the base enclosure 202.

In turn, the motor enclosure 204 is vented to the head enclosure 206 through a pipe 217. The pipe 217 comprises a sealed air coupling at a first end 216 to an opening in the motor enclosure 204 and a rotating sealed air coupling at a second end 218 to an opening in the head enclosure 206. The pipe 217 is configured to pass air from the motor enclosure 204 to the head enclosure 206 through the rotating tilt system on the side of the head enclosure 206.

The three enclosures 202, 204, and 206 are thus connected together by pipes 208 and 217 to form a combined enclosure having pressure and humidity control. The combined enclosure is vented to the external air through a vent pipe 209 via an opening in the head enclosure 206. The vent pipe 209 comprises a rotating sealed air coupling at a first end to the opening in the head enclosure 206. The vent pipe 209 comprises a sealed air coupling at a second end to a drying tube (or chamber) 212, which is sealed air coupled to a drying tube 214. The drying tubes 212 and 214 include a drying agent such as silica gel or other suitable desiccant material. An exit opening of the drying tube 214 includes a membrane 210 that air couples the drying tube 214 to the external air.

The membrane 210 may comprise a hydrophobic membrane material such as GORE-TEX (a registered trademark of W. L. Gore & Associates, Newark, Delaware) or other suitable material that allows air to pass through, but reduces or prevents the passage of water and/or moisture in the form of water droplets. Thus, the membrane 210 is configured to remove water droplets from incoming air and the drying agent of the drying tubes 212 and 214 is configured to remove water vapor (or humidity) from incoming air.

In operation, when the luminaire 200 is initially powered up, both the temperature and internal air pressure rise within the three enclosures 202, 204, and 206. This increase in air pressure forces air out of the enclosures 202, 204, and 206 through the vent pipe 209 and drying tubes 212 and 214 before exiting the luminaire 200 at membrane 210. When the luminaire 200 is powered down, both the temperature and the internal air pressure inside the enclosures 202, 204, and 206 drop and external air may be drawn back into the luminaire 200 through the membrane 210, reducing or eliminating liquid water and/or moisture in the indrawn air. The indrawn air then passes through the drying tubes 212 and 214. The drying tubes 212 and 214 will remove water vapor from the indrawn air, causing the air that enters the enclosures 202, 204, and 206 through vent pipe 209 to have a reduced humidity. This forcing of air out of and subsequent drawing of air back into the enclosures 202, 204, and 206 may be referred to as an 'air cycle path' of the luminaire humidity and pressure control system of the disclosure.

Because the volume of air passing out of and into the enclosures 202, 204, and 206 through the drying tubes 212 and 214 is relatively small, the drying tubes 212 and 214 have a capacity to remove the humidity for multiple on/off cycles of the luminaire 200. In some embodiments the drying tubes 212 and 214 contain enough drying agent to dehumidify 400 on/off cycles of the luminaire 200 before requiring regeneration or replacement of the drying agent by a service technician. The term 'regeneration' refers to a drying treatment that removes absorbed moisture from the drying agent, renewing or regenerating the capacity of the drying agent to continue absorbing moisture. The term 'life' of the drying agent may be used to refer to the time from a first use of the drying agent to the point where its reduced effectiveness as a desiccant requires regeneration or replacement by a service technician. Although the example shown uses two drying tubes 212 and 214, in other embodiments one drying tube (or drying chamber) or more than two drying tubes may be included. Similarly, although some embodiments utilize silica gel as a drying agent, in other embodiments the drying tubes or chambers may additionally or alternatively include other drying agents.

In some embodiments, the hot dry air being forced out when the luminaire 200 is powered on will regenerate the drying agent in the drying tubes, extending the life of the drying agent. In further embodiments, this drying and regeneration process may be enhanced by using a heater (not shown in FIG. 2) inside or around one or both of the drying tubes 212 and 214.

In some embodiments, one or more of the enclosures 202, 204, and 206 may include one or more sensors that are configured to measure characteristics of the enclosure, where the characteristics are selected from, but not limited to, air pressure, air humidity, and/or air temperature. Data samples from such sensors may be collected by a control system of the luminaire 200 and information related to the collected data samples sent (or transmitted) to a user via one or more communication channels such as a display included in the luminaire 200, the wired data link 14 using a protocol such as Remote Device Management (RDM), a web connection via the data link 14, a cellular or WiFi wireless connection, or a near-field communication (NFC) or other wireless communication link. Such sending of the information has the advantage of allowing a user of the luminaire 200 to obtain the information without opening the luminaire 200 or to receive the information at a remote location, rather than being required to access the luminaire 200 to obtain the information. In some embodiments, a plurality of such data samples may be stored in a service log of the luminaire 200 and the contents of the log sent via one or more of the above channels to the user, a service technician, or the manufacturer. Such of a plurality of data samples in a service log has the advantage of giving a historical record of the sensed characteristics within the luminaire. In some such embodiments, the service log may also include one or more timestamps associated with corresponding one or more of the plurality of data samples, wherein a timestamp may indicate a time at which the data sample was collected. As such, the user, a service technician, or the manufacturer may identify a time at which a data sample of interest was collected.

Additionally, in some such embodiments, the control system of the luminaire 200 may determine, based on data from such sensors, whether the sealed enclosures have been effectively sealed (or re-sealed after maintenance). For example, when the luminaire 200 is powered on if an air pressure sensor indicates that the air pressure inside one or more of the enclosures 202, 204, and 206 is not rising, while at the same time the temperature sensor indicates that the temperature in the enclosure is rising, then this data may be interpreted by the control system as an indication that one or more of the enclosures 202, 204, and 206 are incompletely sealed to the external air. Such a determination provides the advantage of (i) enabling a service technician to determine whether the enclosure(s) have been effectively re-sealed after maintenance, prior to returning the luminaire 200 to service, and/or (ii) enabling a user of the luminaire 200 to determine remotely whether the seals have failed in an enclosure that was previously effectively sealed.

Figure 3:
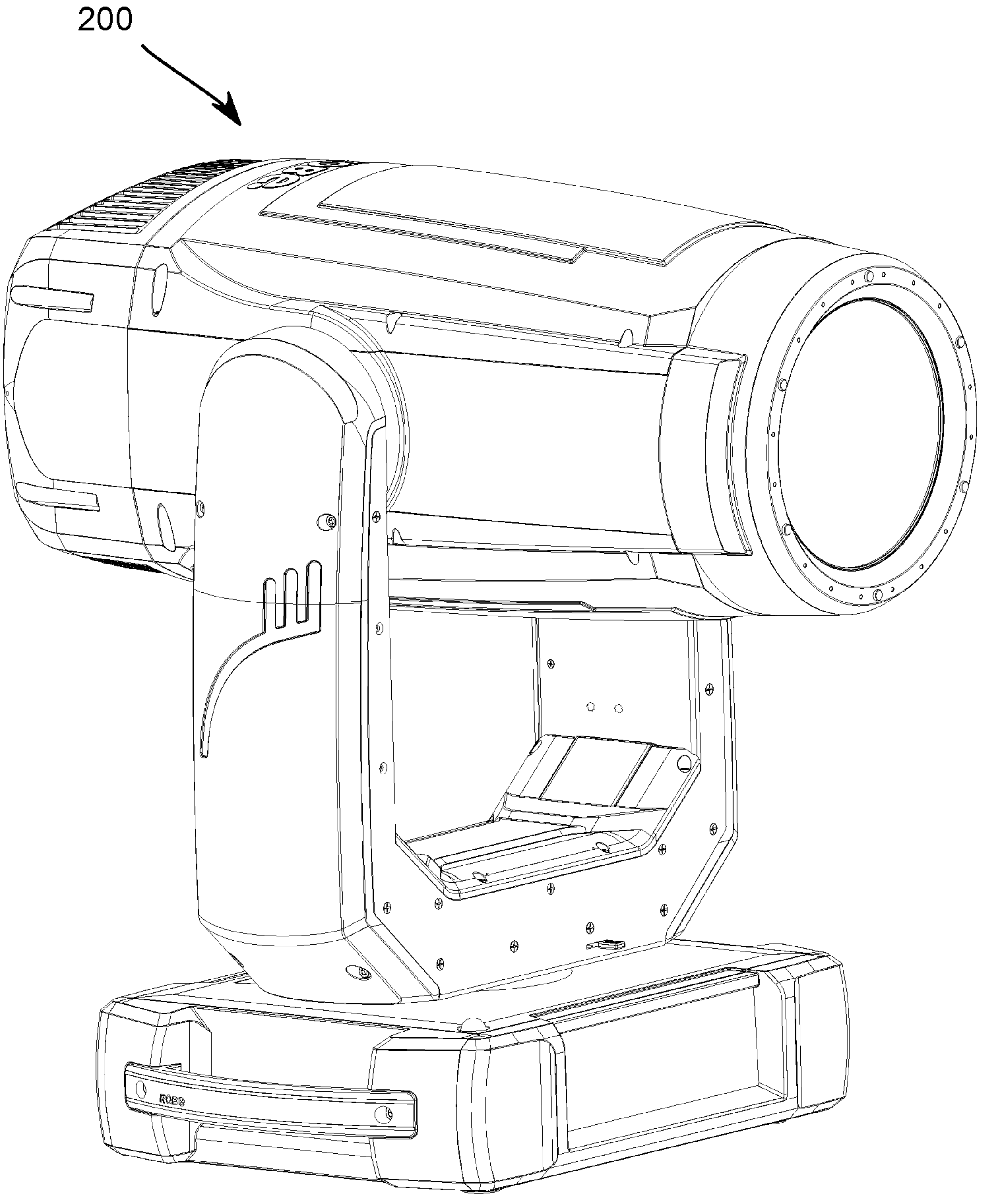
FIG. 3 presents an overview of the luminaire of FIG. 2 in a fully assembled state.

FIG. 3 presents an overview of the luminaire 200 of FIG. 2 in a fully assembled state. The sealed enclosures and associated connecting pipes are hidden in FIG. 3 by external housings or cowls.

Figure 4:
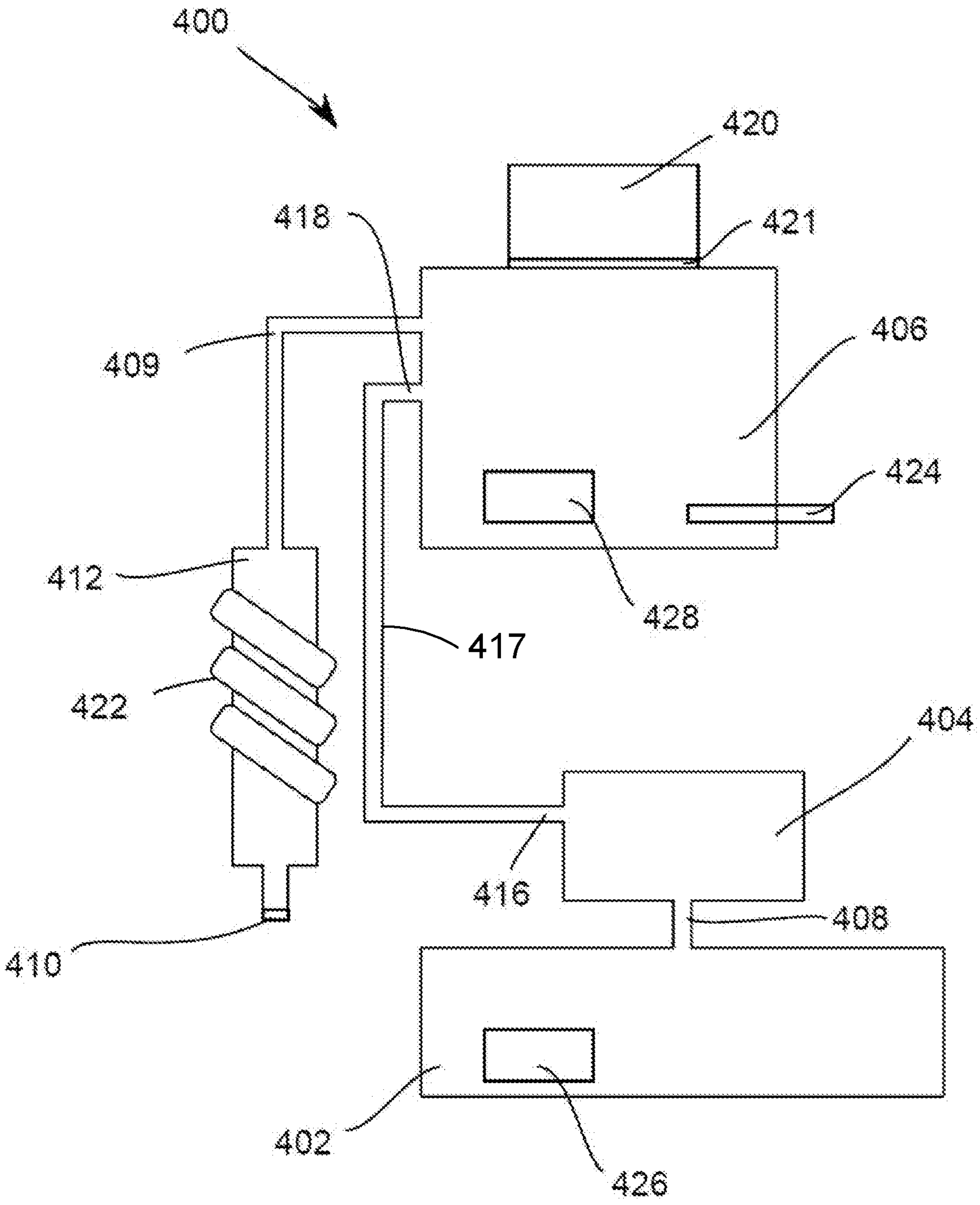
FIG. 4 presents a schematic view of a luminaire humidity and pressure control system according to the disclosure.

FIG. 4 presents a schematic view of a luminaire humidity and pressure control system 400 according to the disclosure. FIG. 4 is a simplified diagrammatic view of the luminaire humidity and pressure control system 400 of the luminaire 200 described with reference to FIG. 2. A base enclosure 402 is vented through a pipe 408 that connects the base enclosure 402 to a motor enclosure 404. In turn, the motor enclosure 404 is vented through a pipe 417 (having ends 416 and 418) that connects the motor enclosure 404 to a head enclosure 406. The three enclosures 402, 404, and 406 are thus connected together with tubing that creates a combined enclosure for pressure and humidity control. The head enclosure 406 is vented through a pipe 409, also venting the enclosures 402 and 404. Finally, at an exit of the drying tube 412, a membrane 410 connects the system to the external atmosphere. Membrane 410 may be made of a micro-filter material such as GORE-TEX which allows air to pass through, but reduces or prevents the passage of water or moisture. In the embodiment shown in FIG. 4, a heater 422 is mounted around (or thermally coupled to) the drying tube 412 and may be controlled by a control system of the luminaire 200 to heat the drying agent during the hot-air venting phase of the cycle and/or other desired periods, providing the advantage of regenerating the drying agent and extending its life. In other embodiments, the heater 422 may be mounted inside the drying tube 412. Still other embodiments may not include the heater 422.

The head enclosure 406 includes a sensor 424 that measures one or more parameters such as air pressure, air humidity, or air temperature. In other embodiments, one or more of such sensors 424 may be included in the enclosures 402 and/or 404. In some embodiments, a plurality of such sensors 424 may be included in one or more of the enclosures 402, 404, and 406.

Data samples from such sensors may be collected by the control system of the luminaire 200. The control circuit 426 is located in the base enclosure 402. In other embodiments, a control circuit 428 may be additionally or alternatively located in the head enclosure 406. In still other embodiments, a control circuit (not shown in FIG. 4) may be located in the motor enclosure 404. Such one or more control circuits may separately or cooperatively form the control system for the luminaire 200. Information related to the collected data samples may be sent to a user by the control system via one or more communication channels as described above. As also described above, in various embodiments, the data samples may include a timestamp and may be stored and sent to the user, a service technician, or the manufacturer.

FIG. 4 further shows a light source 420 external to the head enclosure 406. The light source 420 is optically and physically coupled to the head enclosure 406, but separated and sealed from the head enclosure 406 by a transparent window and gasket 421. Heat generated by the light source 420 may be significant, and such an arrangement provides the advantage of keeping heat emanating from the light source 420 external to the head enclosure 406 and helping to reduce the temperature rise and the air pressure rise within the head enclosure 406. Such reductions have the advantage of lessening the volume of air that exits and re-enters the combined enclosure of the three enclosures 402, 404, and 406 during each on/off cycle, helping to increase the life of the drying agent in drying tube 412.

Figure 5:
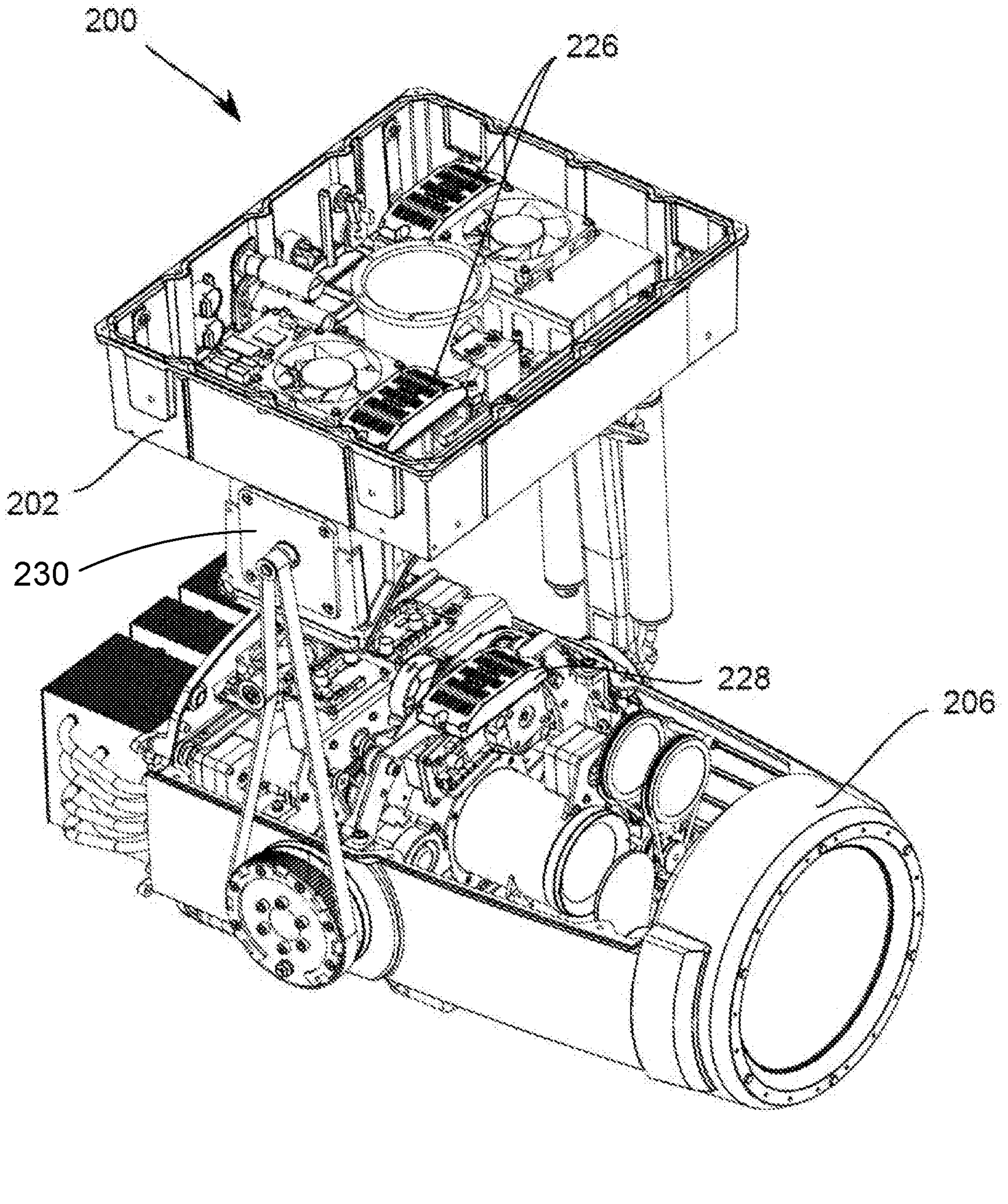
FIG. 5 presents a second view of the luminaire of FIG. 2.

FIG. 5 presents a second view of the luminaire 200 of FIG. 2. The luminaire 200 includes drying boxes 226 in the base enclosure 202 and a drying box 228 in the head enclosure 206. In various embodiments, zero or more drying boxes may be included in any enclosure of a luminaire humidity and pressure control system according to the disclosure.

The drying boxes 226 and 228 are not part of the air cycle path described with reference to FIG. 2, which occurs when the luminaire 200 heats up and cools down. Instead the drying boxes 226 and 228 aid in initial assembly and subsequent maintenance. When the luminaire 200 is manufactured and the enclosures 202, 204, and 206 are first sealed, they will contain the air from the factory, which may be humid. The drying boxes 226 and 228 include a drying agent such as silica gel and a plurality of openings in the box that expose the drying agent to the air in the enclosure. Once the enclosure is sealed, such boxes will remove some of the initial humidity captured within the enclosure, even before the luminaire is powered. The drying boxes 226 and 228 may also help ensure that air in the enclosures remain dry during storage and shipping.

In some embodiments, the drying agent inside any of the drying boxes 226 and 228 and/or the drying tubes 212 and 214 changes color when it absorbs moisture. In some such embodiments, the drying boxes 226 and 228 and/or the drying tubes 212 and 214 are configured to allow such color-changing drying agent to be easily visible. In some such embodiments, the drying boxes 226 and 228 and/or the drying tubes 212 and 214 may be fabricated at least in part of a transparent or translucent material. In other such embodiments, the drying box or drying tube may have an easy to remove portion of the box or tube exposing the drying agent to view. In still other embodiments, one or more of the plurality of openings in the drying box may be sized to allow viewing of the drying agent through the opening. Such a drying agent and drying boxes or drying tubes provide the advantage of enabling a user or service technician to visually check whether the drying agent is ready for use or needs regeneration or replacement before sealing the enclosures 202, 204, and 206 of the luminaire 200.

The inclusion of the drying boxes 226 and 228 provides the advantage of an extra, initial drying cycle, which may serve to extend the life of the drying agents in the drying tubes within the luminaire. The inclusion of the drying boxes 226 and 228 provides the advantage of allowing the luminaire 200 to be placed back into service more quickly, without requiring the use of external tools to dehumidify the sealed enclosure or to flush the humid air from the sealed enclosure with nitrogen or dehumidified air.

Figure 6:
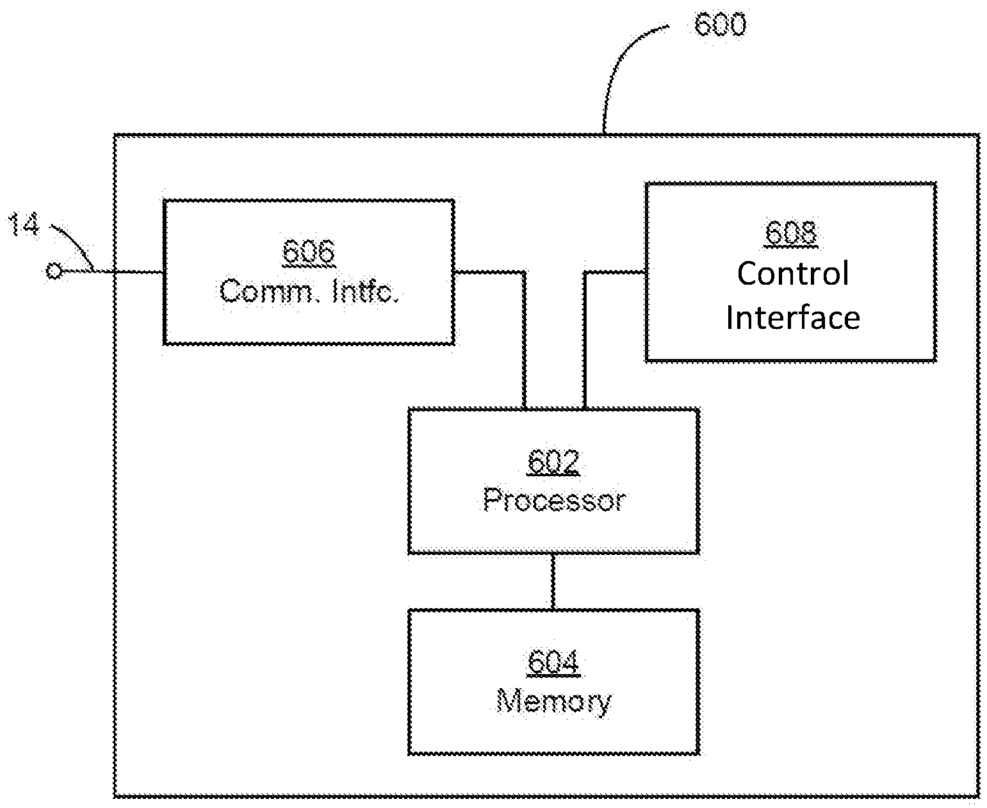
FIG. 6 presents a block diagram of a control system according to the disclosure.

FIG. 6 presents a block diagram of a control system (or controller) 600 according to the disclosure. The control system 600 is suitable for use to control the systems of a luminaire comprising a luminaire humidity and pressure control system according to the disclosure. The control system 600 is also suitable for controlling the light source, optical devices, pan and/or tilt systems, and other control functions of the luminaires 12 and 200 as well as connecting and responding to and storing data read from sensors installed within the luminaires 12 and 200.

The control system 600 includes a processor 602 electrically coupled to a memory 604. The processor 602 is implemented by hardware and software. The processor 602 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 602 is further electrically coupled to and in communication with a communication interface 606. The communication interface 606 is coupled to, and configured to communicate via, the data link 14. The processor 602 is also coupled via a control interface 608 to one or more sensors 424, motors, actuators, controls, heater 422, and/or other devices. The processor 602 is configured to receive control signals from the data link 14 via the communication interface 606 and, in response, to control systems and mechanisms of the luminaire 12 via the control interface 608.

Via the control interface 608, the processor 602 is further electrically coupled to and in communication with temperature, humidity, and/or pressure sensors such as the sensor 424. The processor 602 is configured to receive control signals from the data link 14 via the communication interface 606 and, in response, measure, store, and transmit information related to data sampled from one or more of the sensors 424.

The control system 600 is suitable for implementing processes, module control, optical device control, pan and tilt movement, parameter control, motor control, position sensor control, brake control, and other functionality as disclosed herein, which may be implemented as instructions stored in the memory 604 and executed by the processor 602. The memory 604 comprises one or more disks and/or solid-state drives and may be used to store instructions and data that are read and written during program execution. The memory 604 may be volatile and/or non-volatile and may be read-only memory (ROM), random access memory (RAM), ternary content-addressable memory (TCAM), and/or static random-access memory (SRAM).

Figure 7:
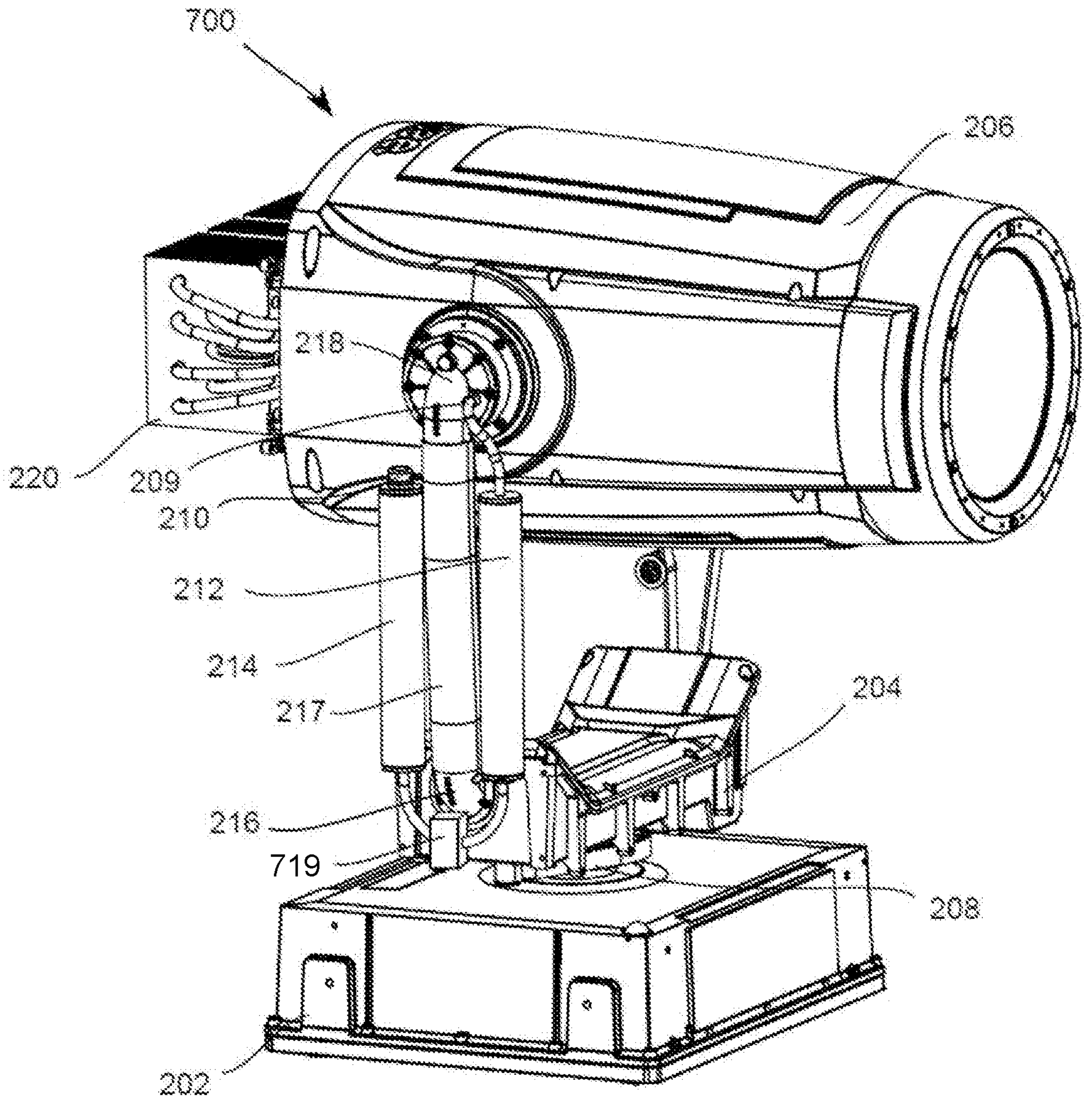
FIG. 7 presents a first view of a luminaire comprising a second luminaire humidity and pressure control system according to the disclosure.

FIG. 7 presents a first view of a luminaire 700 comprising a second luminaire humidity and pressure control system according to the disclosure. The second luminaire humidity and pressure control system is very similar to the luminaire humidity and pressure control system shown in FIG. 2, however it further includes a remotely operable air valve 719 configured to pass air when open and block air passage when closed. The valve 719 is positioned, in the embodiment shown in FIG. 7, between the drying tubes 212 and 214. Thus, when closed, the valve 719 is configured to block air passage between the connected enclosures 202, 204, and 206 and the drying tube 214 and the membrane 210.

In this embodiment, the connected enclosures 202, 204, and 206 are vented to the outside air through the valve 719. The valve 719 may be an electromagnetic valve that is electrically coupled to the control system of the luminaire 200, which may be configured to open and close the valve 719. Access panels and covers of the connected enclosures 202, 204, and 206 are configured with seals and, when the seals are functioning as intended, air flows into and out of the connected enclosures 202, 204, and 206 only through the valve 719. Thus, when the valve 719 is closed, if air flows into or out of the connected enclosures 202, 204, and 206, it may be assumed that it is flowing through the seals.

Although in the embodiment shown in FIG. 7, the valve 719 is positioned between drying tubes 212 and 214, in other such embodiments the valve 719 may be positioned anywhere in the air path from the connected enclosures 202, 204, and 206 to the membrane 210. However, positioning the valve 719 with at least one of the drying tubes 212 and 214 between the valve 719 and the membrane 210 provides the benefit that, in such a position, the air passing through the valve 719 has been dried, which reduces the likelihood that condensation will form within the valve 719. The presence of such condensation when the ambient temperature falls below freezing could increase the likelihood that the valve 719 will freeze up and cease to function properly.

Figure 8:
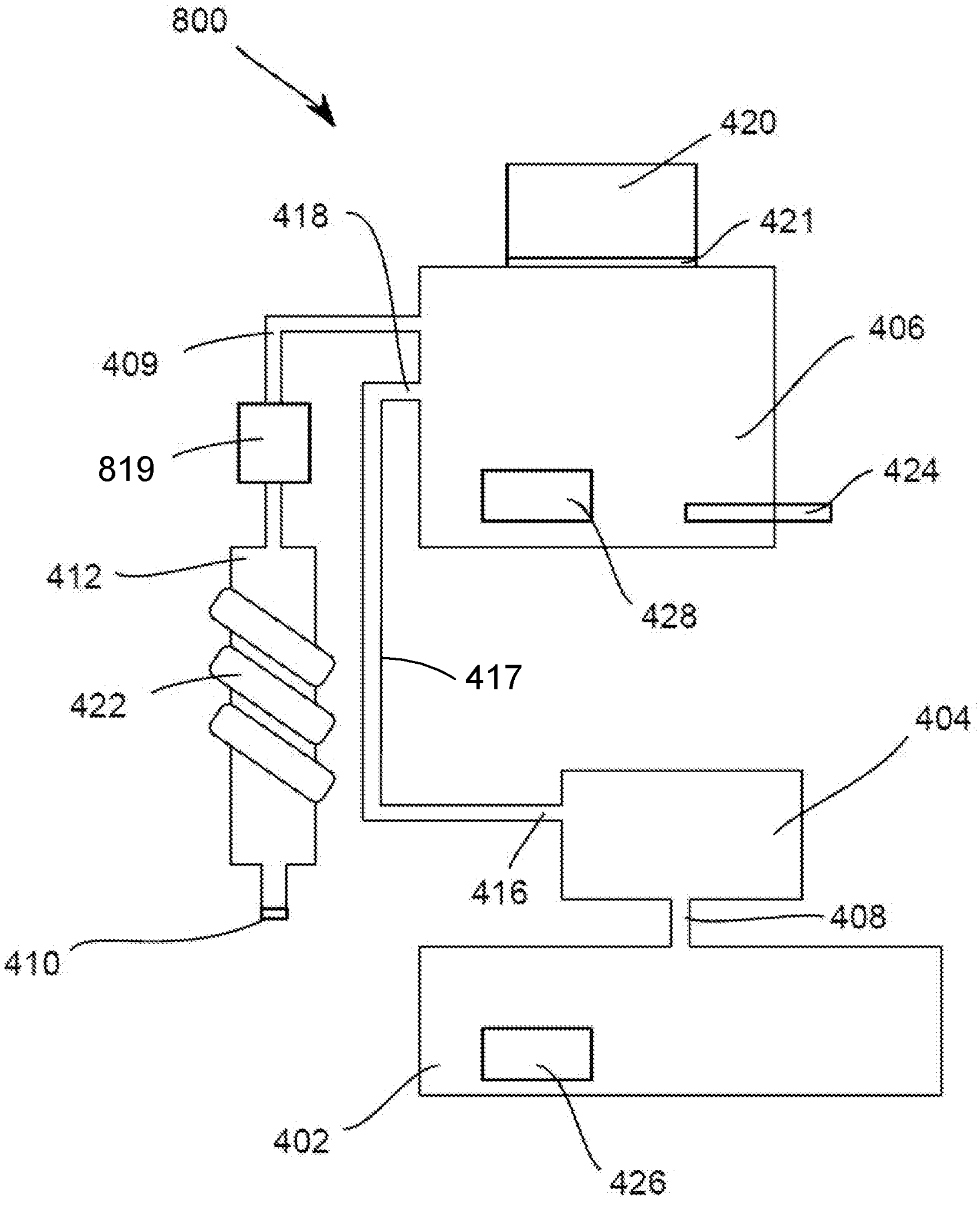
FIG. 8 presents a schematic view of the second luminaire humidity and pressure control system of FIG. 7.

FIG. 8 presents a schematic view of the second luminaire humidity and pressure control system of FIG. 7. FIG. 8 is a simplified diagrammatic view of the second luminaire humidity and pressure control system 800 of the luminaire 700. As described for FIG. 7, the second luminaire humidity and pressure control system 800 is very similar to the luminaire humidity and pressure control system 400 shown in FIG. 4, however the system 800 further includes a valve 819 positioned, in the embodiment shown in FIG. 8, between the head enclosure 406 and the drying tube 412.

The valve 819 is an electromagnetic valve that is electrically coupled to the control system of the luminaire 700, which is configured to open and close the valve 819. As described with reference to FIG. 7, the connected enclosures 402, 404, and 406 are sealed and, when the seals are functioning as intended, air flows into and out of the connected enclosures 402, 404, and 406 only through the valve 819. Thus, when the valve 819 is closed, air should only flow into or out of the connected enclosures 402, 404, and 406, if at all, through the seals. Although in the embodiment shown in FIG. 4, the valve 819 is positioned between the head enclosure 406 and the drying tube 412, in other such embodiments the valve 819 may be positioned anywhere in the air path from the connected enclosures 402, 404, and 406 to the membrane 410. However, as described above, positioning the valve 819 with the drying tube 412 between the valve 819 and the membrane 410 may reduce the likelihood that condensation will form within the valve 819.

In the embodiments shown in FIG. 7 (the following description also applies to FIG. 8, the valve 819, and the connected enclosures 402, 404, and 406), the valve 719 may be operated to seal the connected enclosures 202, 204, and 206 from the outside air so that pressure changes in one or more of the connected enclosures 202, 204, and 206 may be measured. Such measurement provides a test of whether the seals of the connected enclosures 202, 204, and 206 are adequately air-tight to permit the luminaire humidity and pressure control system 400 (or 800) to function as designed to reduce water ingress into the luminaire.

When the luminaire 700 is first built, such a test may be run to confirm that the luminaire 700 has been properly assembled. The test may also be run after maintenance is performed on the luminaire 700, where the maintenance requires that a technician (or other user) remove and reattach a sealed cover (or a sealed panel in a cover, both collectively referred to herein as a sealed cover) to access a component in one of the connected enclosures 202, 204, or 206.

The test may be initiated by a control signal (such as a command) that is received via the data link 14 or via an input panel of the luminaire 700. In some embodiments, a user may initiate the test at any time that the luminaire 700 is powered on. The control system 600 of the luminaire 700 may be configured to perform the test automatically when the luminaire 700 is initially powered up. Such configuration may be set by a user by a control signal received via the data link 14 or via the input panel of the luminaire 700.

Figure 9:
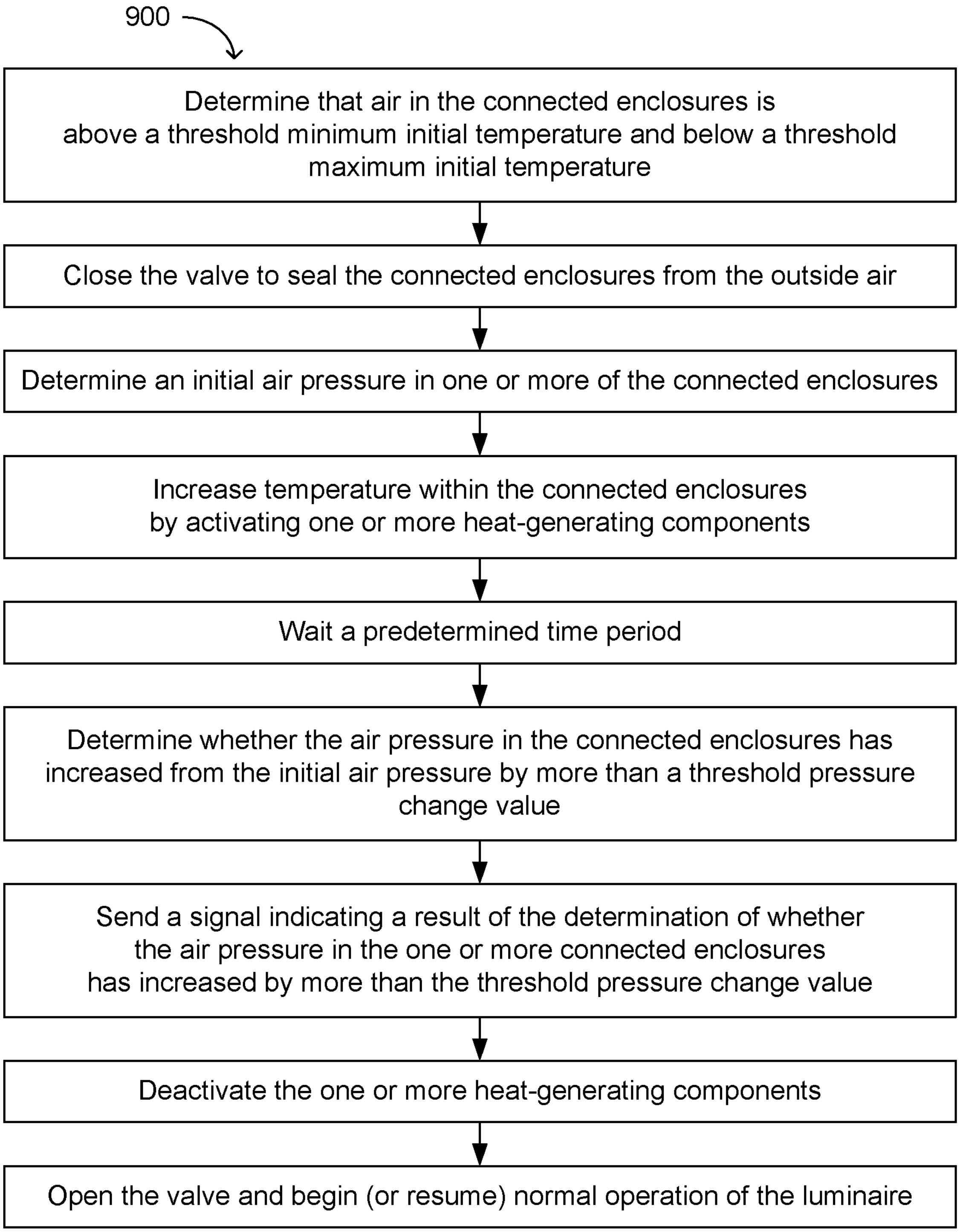
FIG. 9 presents a flow chart of a first process for testing seals in the second luminaire humidity and pressure control system according to the disclosure.
Figure 10:
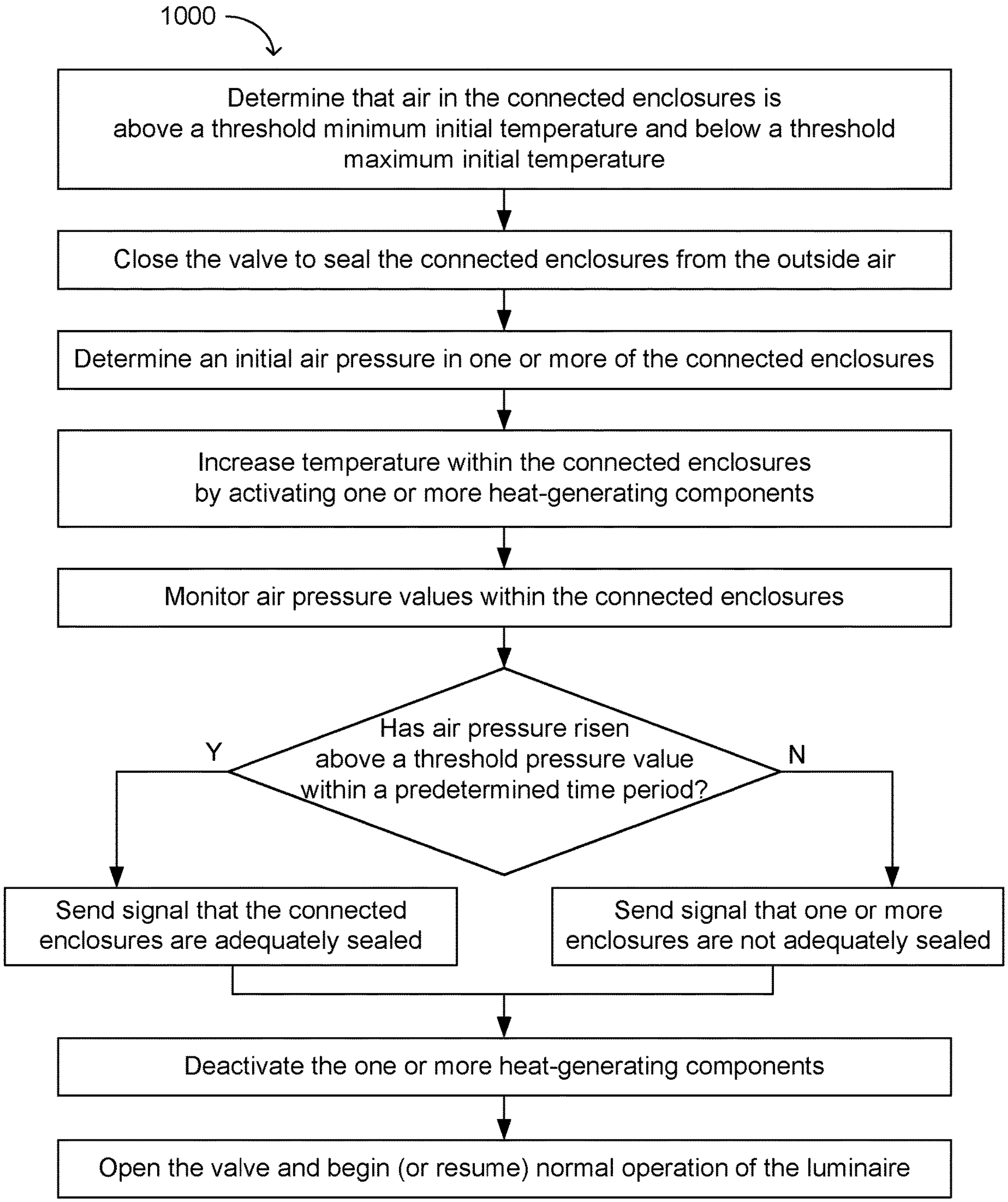
FIG. 10 presents a flow chart of a second process for testing seals in the second luminaire humidity and pressure control system according to the disclosure.

FIGS. 9 and 10, respectively, present flow charts of first and second processes 900 and 1000 for testing seals in the second luminaire humidity and pressure control system according to the disclosure. Both processes 900 and 1000 begin with the following steps:

1. Using one or more temperature sensors within one or more of the connected enclosures 202, 204, and 206, an initial temperature in the luminaire 700 is determined.
   a. If the air in the connected enclosures is above a threshold maximum initial temperature, the process is delayed until the temperature falls below the threshold maximum initial temperature, by active or passive means.
   b. In some embodiments, if the air in the connected enclosures is below a threshold minimum initial temperature, one or more heat-generating components of the luminaire 700 may be activated, to actively raise the temperature in the connected enclosures. In some such embodiments, the heat-generating components of the luminaire 700 are deactivated (until they are activated again later in the process) once the temperature rises above the threshold minimum initial temperature. In other embodiments, the process is delayed until the temperature rises above the threshold minimum initial temperature by passive means.
2. Close the valve 719 to seal the connected enclosures 202, 204, and 206 from the outside air.
3. Determine an initial air pressure in one or more of the connected enclosures 202, 204, and 206.
4. Increase the temperature within the connected enclosures 202, 204, and 206 by activating one or more heat-generating components of the luminaire 700. The temperature may be increased by performing any or all of the following actions: activating the light source 220, applying a holding current to motors in the motor enclosure 204, activating electronic circuits on printed circuit boards in the connected enclosures, activating power supplies in the base enclosure 202, or activating a standalone heating element located in any or all of the connected enclosures. In some embodiments, a framing shutter or other light-blocking optical device may be engaged to prevent the luminaire 700 from projecting a light beam during this step of the process.

The process 900 continues with the following steps:

5. After a predetermined time period,
   a. Determine whether a current air pressure in the one or more connected enclosures 202, 204, and 206 has increased from the initial air pressure by more than a threshold pressure change value.
   b. Send a signal indicating a result of the determination of whether the current air pressure in the one or more connected enclosures 202, 204, and 206 has increased from the initial air pressure by more than the threshold pressure change value.
   c. Deactivate the one or more heat-generating components of the luminaire 700 and the light-blocking optical device (if used).
   d. Open the valve 719 and begin (or resume) normal operation of the luminaire 700.

The process 1000 continues with the following steps:

5. Monitor a current air pressure within the connected enclosures 202, 204, and 206.
6. If the current air pressure has increased from the initial air pressure by more than the threshold pressure change value within a predetermined time period (e.g., if the threshold pressure change value is exceeded before the predetermined time period has elapsed), then send a signal indicating that the connected enclosures are adequately sealed. If the current air pressure does not increase from the initial air pressure by more than the threshold pressure change value within the predetermined time period (e.g., if the predetermined time period has elapsed and the threshold pressure change value has not been exceeded), then send a signal indicating that one or more of the connected enclosures are not adequately sealed.
7. Regardless of whether the current air pressure increased from the initial air pressure by more than the threshold pressure change value within the predetermined time period,
   a. Deactivate the one or more heat-generating components of the luminaire 700 and the light-blocking optical device (if used).
   b. Open the valve 719, and begin (or resume) normal operation of the luminaire 700.

In some embodiments the threshold pressure change value is 7 millibars and the predetermined time period is 5 minutes. In other embodiments, the threshold pressure change value is 20 millibars and the predetermined time period is 30 minutes.

In some embodiments, the threshold minimum initial temperature in the one or more of the connected enclosures 202, 204, and 206 is 0° C. In some embodiments, the threshold maximum initial temperature in the one or more of the connected enclosures 202, 204, and 206 is C. In such embodiments, the temperature may rise to 70-75° C. during the test. In general, the threshold maximum initial temperature will be at least 10-15° C. less than the temperature achieved once the heat-generating components have been activated. The threshold maximum initial temperature may be selected based on where in the connected enclosures 202, 204, and 206 the one or more temperature sensors are located.

In some embodiments, the control system may also monitor a temperature rise and correlate it with the expected pressure rise to determine whether the connected enclosures 202, 204, and 206 are adequately sealed.

In some embodiments, the signal indicating a result of the test is sent as a message over a communication link, such as data link 14. In other embodiments, the signal is sent as an indicator or status display on the luminaire 700. In still other embodiments, the signal is sent using both methods.

In some embodiments, the test sequence is performed every time the luminaire 700 is initially powered up. In some embodiments, the test sequence is performed in response to a signal received from a user, such as a command received via an input panel of the luminaire 700 or via a communication link, such as the data link 14 or a wireless communication link. In some embodiments, as a user-selectable option, the control system of the luminaire 700 does not begin normal operation if the connected enclosures 202, 204, and 206 are not adequately sealed.

Although the luminaire 700 and the second luminaire humidity and pressure control system 800 include three enclosures, in other embodiments any number of enclosures may be included.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A luminaire, comprising:
an enclosure comprising one or more luminaire components configured to modify and emit a light beam, the enclosure including a sealed cover and a first opening, the enclosure being otherwise sealed from external air;
a remotely operable air valve comprising second and third openings, the air valve coupled at the second opening by a sealed air coupling to the enclosure at the first opening; and
a chamber comprising a drying agent and fourth and fifth openings and being otherwise sealed from the external air, wherein:
the chamber is coupled at the fourth opening by a sealed air coupling to the air valve at the third opening; and
the fifth opening comprises a membrane completely covering the fifth opening, the membrane comprising a material configured to allow air to pass through the material while reducing passage of water droplets in the air,
wherein the air valve is configured to block air passage between the enclosure and the membrane when closed and to allow air passage between the enclosure and the membrane when open.

2. The luminaire of claim 1, wherein the enclosure is a first enclosure and further comprises a sixth opening, the luminaire further comprising:
a second enclosure comprising electronic circuits electrically coupled to the luminaire components of the first enclosure, the second enclosure including a seventh opening and being otherwise sealed from the external air, wherein:
the first enclosure is rotatably mounted to the second enclosure;
the second enclosure is coupled at the seventh opening by a rotatable sealed air coupling to the first enclosure at the sixth opening; and
the air valve is configured to block air passage between both the first and second enclosures and the membrane when closed and to allow air passage between both the first and second enclosures and the membrane when open.

3. The luminaire of claim 2, further comprising a third enclosure, wherein:
the first enclosure is rotatably mounted to the third enclosure and the third enclosure is rotatably mounted to the second enclosure, whereby the first enclosure is rotatably mounted to the second enclosure by the third enclosure;
the third enclosure comprises eighth and ninth openings and is otherwise sealed from the external air;
the second enclosure is coupled at the seventh opening by a rotatable sealed air coupling to the third enclosure at the eighth opening;
the first enclosure is coupled at the sixth opening by a rotatable sealed air coupling to the third enclosure at the ninth opening;
the second enclosure is coupled at the seventh opening to the first enclosure at the sixth opening by the third enclosure; and
the air valve is configured to block air passage between all of the first, second, and third enclosures and the membrane when closed and to allow air passage between all of the first, second, and third enclosures and the membrane when open.

4. The luminaire of claim 1, further comprising a control system configured to perform a test to determine whether the enclosure is adequately sealed, wherein:
the enclosure further comprises a heat-generating component and an air pressure sensor; and
the control system is electrically coupled to the air valve, the heat-generating component, and the air pressure sensor, the control system configured to:
close the air valve to seal the enclosure from outside air entering through the chamber;
determine an initial air pressure, as sensed by the air pressure sensor;
activate the heat-generating component;
determine whether a current air pressure sensed by the air pressure sensor has increased from the initial air pressure by more than a threshold pressure change value within a predetermined time period;
in response to the current air pressure having increased by more than the threshold pressure change value within the predetermined time period, send a signal comprising an indication that the enclosure is adequately sealed;
in response to the current air pressure not having increased by more than the threshold pressure change value within the predetermined time period, send a signal comprising an indication that the enclosure is not adequately sealed;
deactivate the heat-generating component; and
open the air valve.

5. The luminaire of claim 4, wherein activating the heat-generating component comprises one or more of activating a light source, applying a holding current to motors in the enclosure, activating electronic circuits in the enclosure, activating power supplies in the enclosure, or activating a standalone heating element located in the enclosure.

6. The luminaire of claim 5, wherein:
the enclosure further comprises a light-blocking optical device;
activating the heat-generating component further comprises activating the light-blocking optical device to prevent the luminaire from projecting a light beam while performing the test to determine whether the enclosure is adequately sealed; and
deactivating the heat-generating component further comprises deactivating the light-blocking optical device.

7. The luminaire of claim 4, wherein:
the enclosure further comprises a second sensor configured to measure a temperature of the enclosure; and
the control system is electrically coupled to the second sensor and further configured to:
collect data from the second sensor; and
test whether the enclosure is adequately sealed only when the data indicates that the temperature is greater than a threshold minimum initial temperature and less than a threshold maximum initial temperature.

8. The luminaire of claim 7, wherein the control system is further configured to activate the heat-generating component when the data indicates that the temperature is less than the threshold minimum initial temperature.

9. The luminaire of claim 4, wherein:

the enclosure further comprises a third sensor configured to measure one or more of air humidity and air temperature; and the control system is electrically coupled to the third sensor and further configured to collect data from one or both of the air pressure sensor and the third sensor and to send information related to the collected data to a user of the luminaire via a communication channel.

10. The luminaire of claim 9, wherein the communication channel comprises at least one of a display of the luminaire, a wired data link, and a wireless communication link.

11. The luminaire of claim 10, wherein the information related to the collected data comprises:

a plurality of data samples collected from the one or both of the air pressure sensor and the third sensor by the control system and one or more timestamps associated with corresponding one or more of the plurality of data samples.

12. The luminaire of claim 4, wherein the control system is further configured to perform the test to determine whether the enclosure is adequately sealed when the luminaire is initially powered up.

13. The luminaire of claim 4, wherein the control system is further configured to perform the test to determine whether the enclosure is adequately sealed in response to a signal received from a user of the luminaire.

14. The luminaire of claim 13, wherein the signal is received via one of an input panel of the luminaire, a wired data link, and a wireless communication link.

15. A method for performing a test to determine whether an enclosure of a luminaire is adequately sealed, where the enclosure is open to outside air, the method comprising:

initiating by a control system of the luminaire the test by closing an air valve to seal the enclosure from outside air;

determining by the control system an initial air pressure in the enclosure;

activating by the control system a heat-generating component of the enclosure after closing the air valve;

waiting by the control system for a predetermined time period;

determining by the control system whether a current air pressure in the enclosure has increased from the initial air pressure by more than a threshold pressure change value;

sending by the control system a signal indicating a result of the determination of whether the current air pressure in the enclosure has increased from the initial air pressure by more than a threshold pressure change value;

deactivating by the control system the heat-generating component; and reopening by the control system the enclosure to outside air by opening the air valve after deactivating the heat-generating component.

16. The method of claim 15, further comprising:

determining by the control system a temperature of the enclosure; and performing the test to determine whether the enclosure is adequately sealed only when the temperature of the enclosure is greater than a threshold minimum initial temperature and less than a threshold maximum initial temperature.

17. The method of claim 16, further comprising:

in response to determining that the temperature of the enclosure is less than the threshold minimum initial temperature, activating by the control system the heat-generating component.

18. The method of claim 15, wherein activating the heat-generating component further comprises activating by the control system a light-blocking optical device of the enclosure to prevent the luminaire from projecting a light beam while performing the test to determine whether the enclosure is adequately sealed.

19. The method of claim 15, further comprising:

collecting by the control system data relating to one or more of air pressure, air humidity, and air temperature within the enclosure; and sending by the control system information related to the collected data to a user of the luminaire via a communication channel.

20. The method of claim 19, wherein the collected data comprises a plurality of data samples and one or more timestamps associated with corresponding one or more of the plurality of data samples.

* * * * *